UNITED STATES PATENT OFFICE.

ARTHUR I. JUDGE, OF BALTIMORE, MARYLAND.

ART OF CANNING GREEN CORN.

970,058. Specification of Letters Patent. Patented Sept. 13, 1910.

No Drawing. Application filed September 3, 1909. Serial No. 516,076.

*To all whom it may concern:*

Be it known that I, ARTHUR I. JUDGE, of the city of Baltimore and State of Maryland, have invented certain Improvements in the Art of Canning Green Corn, of which the following is a specification.

In the canning of corn as ordinarily practiced, the grain in a green and unripe condition is first cut or scraped from the cob, then thoroughly heated, after which it is placed in cans which are hermetically sealed and immersed in boiling water, and cooked for a sufficient time to insure its keeping qualities.

When the grain is cut or scraped from the cob in a raw condition, much of its liquid constituent containing starch and sugar is lost, as is also considerable of the juice which is left in the cob, and which if the corn had been allowed to fully ripen, would have passed into the grain and increased its value as a food.

The superiority of corn cooked on the cob over that which is removed when green and subsequently cooked, is well known, and is considered to have a higher food value; and the object of the present invention is to retain in canned green corn as much as is possible of the starch and sugar which are lost in the ordinary process of canning above briefly described.

In carrying out my improved process, the green ears of corn are first cooked by boiling or steaming, by which the starch held in suspension in the juice of the grain, is partially coagulated and becomes to a certain extent fixed, and the sugar which is in solution in the juice retained in combination with the starch. In the said cooking operation the grain is expanded by heat, and draws from the cob a portion of the liquid therein, which liquid like that in the grain, contains starch and sugar. The grain, now cooked, and in a steaming hot condition, is stripped or cut from the cob and then while still hot placed in cans which are sealed and processed as in the ordinary canning operation, to insure its keeping qualities.

It will be understood that corn canned by my improved process contains practically the entire nutritious constituents of the ear and the flavor of the grain is preserved, and that without increasing the cost of the canning operation.

I claim—

1. The process of canning green corn which consists in cooking the ears of corn by boiling or steaming, and then at once stripping the kernels from the cob, and canning them while they are in a steaming hot condition, substantially as specified.

2. The process of canning green corn which consists in cooking the ears of corn by boiling or steaming, then removing the grain from the cob while steaming hot, then placing the said grain while still hot in cans, then hermetically sealing the cans, and then immersing the sealed cans in boiling water whereby the inclosed grain is subjected to a second cooking operation, substantially as specified.

ARTHUR I. JUDGE.

Witnesses:
THOMAS G. HULL,
WM. T. HOWARD.